(12) United States Patent
Chang

(10) Patent No.: US 10,910,970 B2
(45) Date of Patent: Feb. 2, 2021

(54) MOTOR WITH INTERNAL ENCODER UNIT

(71) Applicant: ARCUS TECHNOLOGY, INC., Livermore, CA (US)

(72) Inventor: Christopher C. Chang, Pleasanton, CA (US)

(73) Assignee: ARCUS TECHNOLOGY, INC., Livermore, CA (US)

( * ) Notice: Subject to any disclaimer, the term of this patent is extended or adjusted under 35 U.S.C. 154(b) by 0 days.

(21) Appl. No.: 16/449,086

(22) Filed: Jun. 21, 2019

(65) Prior Publication Data

US 2019/0393814 A1 Dec. 26, 2019

Related U.S. Application Data

(60) Provisional application No. 62/688,342, filed on Jun. 21, 2018.

(51) Int. Cl.
| | |
|---|---|
| *H02P 8/16* | (2006.01) |
| *H02K 7/08* | (2006.01) |
| *H02K 37/04* | (2006.01) |
| *H02K 11/22* | (2016.01) |

(52) U.S. Cl.
CPC ............... *H02P 8/16* (2013.01); *H02K 7/083* (2013.01); *H02K 11/22* (2016.01); *H02K 37/04* (2013.01); *H02K 2211/03* (2013.01)

(58) Field of Classification Search
CPC . G05B 2219/34435; G05B 2219/41326; G01J 1/0266; G01J 5/0871; G01J 1/1626; H02P 1/00; H02P 1/04; H02P 1/24; H02P 1/26; H02P 1/42; H02P 1/46; H02P 3/00; H02P 3/18; H02P 7/00; H02P 8/00; H02P 8/02; H02P 8/22; H02P 8/24; H02P 8/34; H02P 8/40; H02P 21/00; H02P 23/00; H02P 25/00; H02P 27/00; H02P 27/023; H02P 27/04; H02P 27/06; H02P 29/0066; H02P 6/00; H02P 6/005; H02P 6/002; H02P 6/008; H02P 6/14; G08C 19/20; H02K 41/03; H02H 1/0023
USPC ....... 318/400.4, 685, 696, 400.01, 700, 701, 318/727, 801
See application file for complete search history.

(56) References Cited

U.S. PATENT DOCUMENTS

| | | | | |
|---|---|---|---|---|
| 5,103,225 | A | * | 4/1992 | Dolan ..................... H03M 1/30 318/400.22 |
| 5,907,244 | A | * | 5/1999 | Crabill ................. G01R 31/346 324/545 |
| 7,508,154 | B1 | * | 3/2009 | Labriola, II ........... H02K 41/03 318/432 |

(Continued)

FOREIGN PATENT DOCUMENTS

WO    2018008216 A1    1/2018

OTHER PUBLICATIONS

International Search Report and Written Opinion, PCT/US19/38567, dated Sep. 24, 2019.

*Primary Examiner* — Antony M Paul
(74) *Attorney, Agent, or Firm* — Loza & Loza, LLP; Thomas H. Ham

(57) ABSTRACT

A motor and a method of operating the motor uses an encoder disk attached to the rotor of the motor and an encoder reader positioned to optically obtain rotational information of the rotor. The encoder disk and the encoder reader are located within an interior region of the stator of the motor in which the rotor is positioned to rotate.

14 Claims, 12 Drawing Sheets

(56) References Cited

U.S. PATENT DOCUMENTS

| | | | |
|---|---|---|---|
| 8,653,707 B2* | 2/2014 | Furukawa | H02K 1/30 310/68 B |
| 9,509,195 B1* | 11/2016 | Edsinger | H02K 11/22 |
| 2004/0075412 A1 | 4/2004 | Feres | |
| 2005/0167577 A1* | 8/2005 | Kawai | G01D 5/3473 250/231.18 |
| 2016/0294252 A1 | 10/2016 | Whiteley et al. | |
| 2018/0358870 A1* | 12/2018 | Kawanami | A61B 90/25 |

* cited by examiner

MOTOR WITH INTERNAL ENCODER UNIT

CROSS REFERENCE TO RELATED APPLICATION

This application is entitled to the benefit of U.S. Provisional Patent Application Ser. No. 62/688,342, filed on Jun. 21, 2018, which is incorporated herein by reference.

BACKGROUND OF THE INVENTION

Stepper motors are low cost and easy to use motors that are commonly used in low performance motion control applications, such as three-dimensional (3D) printers, simple pumps, and hobby robots. The main reason for the low cost of stepper motors is that these motors have fewer numbers of magnets compared to high-end brushless servo motors and use low-cost high-volume friendly laminated sheet metal materials.

Stepper motors have high number of poles (50 poles for 2 Phase stepper motors) and produces high torque at low speed compared to other types of motors of similar size, such as direct current (DC) motors or brushless DC (BLDC) motors. At high speed, the torque of stepper motor drops significantly, and thus, is not useful in such applications. For low to mid speed applications, stepper motors are ideal in cost and performance.

Typically, the stepper motors are controlled in open-loop mode using a low cost open-loop stepper motor driver. The main disadvantage of the open-loop control is that there is no feedback, and thus, the motors must run at high current to ensure position control, which typically leads to overheating of the stepper motors. Additionally, when running stepper motors in open-loop, the position accuracy is not guaranteed. Furthermore, higher noise is also associated with running the stepper motors in open-loop and high constant current.

In order to address these issues, recent efforts have been to make the stepper motor run like a closed loop servo motor by attaching an encoder unit to the stepper motor. By attaching an encoder to a stepper motor and running in closed loop, following features are achieved: more accurate position control, cooler and more efficient running, and quieter operation.

Even with the encoder unit, the stepper motor is still cheaper than the BLDC motors due to the fact that the manufacturing cost of such stepper motor is significantly less costly. However, the cost advantage of the stepper motor is reduced dramatically with the addition of the encoder unit. In addition, adding the encoder unit on the stepper motor increases the overall size of the motor.

SUMMARY OF THE INVENTION

A motor and a method of operating the motor uses an encoder disk attached to the rotor of the motor and an encoder reader positioned to optically obtain rotational information of the rotor. The encoder disk and the encoder reader are located within an interior region of the stator of the motor in which the rotor is positioned to rotate.

A motor in accordance with an embodiment of the invention comprises a stator with an interior region, a rotor assembly with a rotor connected to a shaft, the rotor being positioned within the interior region of the stator, an encoder disk attached to the rotor, the encoder disk being positioned within the interior region of the stator, and an encoder reader positioned within the interior region of the stator facing the encoder disk to optically obtain rotational information of the rotor.

A method of operating a motor in accordance with an embodiment of the invention comprises applying driving signals to the motor to drive a rotor of the motor to rotate within an interior region of a stator, emitting light from an encoder reader to an encoder disk attached to the rotor, the encoder disk and the encoder reader being positioned within the interior region of the stator; and receiving the light from the encoder disk at the encoder reader as the rotor is rotated, wherein the received light is used to obtain rotational information of the rotor.

Other aspects and advantages of the present invention will become apparent from the following detailed description, taken in conjunction with the accompanying drawings, illustrated by way of example of the principles of the invention.

DETAILED DESCRIPTION

As explained above, current stepper motors with encoders are relatively expensive to manufacture and the overall size of the motors are significantly increased. The encoders that are used in the stepper motors are either transmissive type encoders or reflective type encoders.

Figure 1B:
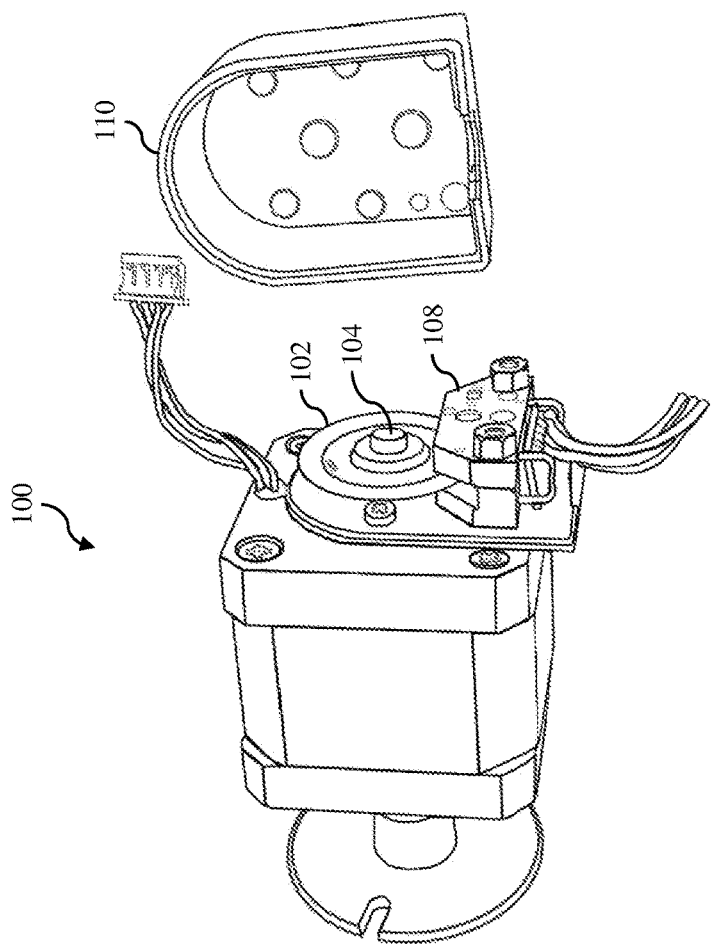
FIGS. 1A and 1B illustrate a stepper motor with a transmissive type encoder in accordance with the prior art.
Figure 1A:
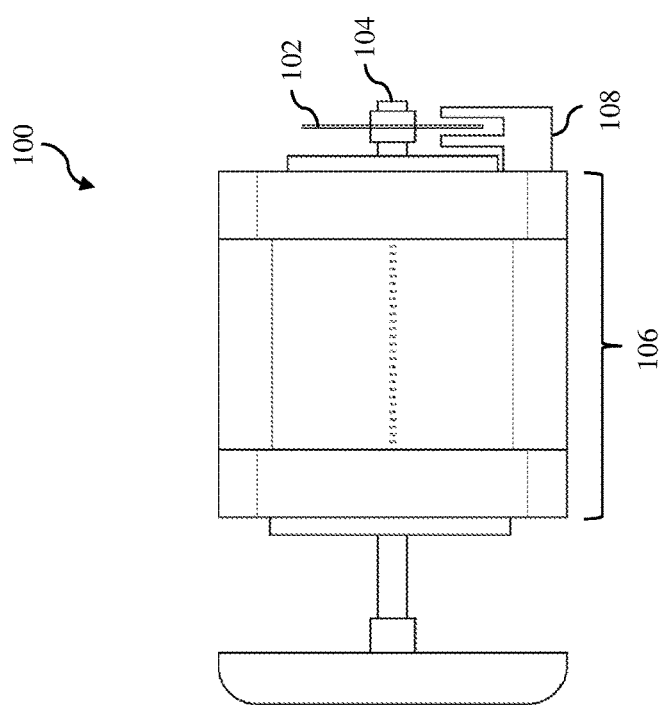

FIGS. 1A and 1B illustrate a conventional stepper motor 100 with a transmissive type encoder. FIG. 1A is a simple diagram of the stepper motor 100, while FIG. 1B is a more realistic illustration of the stepper motor 100. As shown in FIGS. 1A and 1B, the stepper motor 100 includes an encoder disk 102 attached to a rotating shaft 104 of the motor at the back of the motor outside of a main motor assembly 106, which houses a stator and a rotor (not shown) of the motor. In addition, the stepper motor 100 includes an encoder reader 108 that uses a light emitter and a light receiver (not shown) to transmit light from the light emitter through the encoder disk 102 to the light receiver. The light received at the light receiver of the encoder reader 108 provides information on the rotational motion of the encoder disk 102, which matches the rotation of the shaft 104 with respect to speed and position. As illustrated in FIG. 1B, the encoder disk 102 and the encoder reader 108 may be enclosed by a cover 110 outside of the main motor assembly 106.

Figure 2:
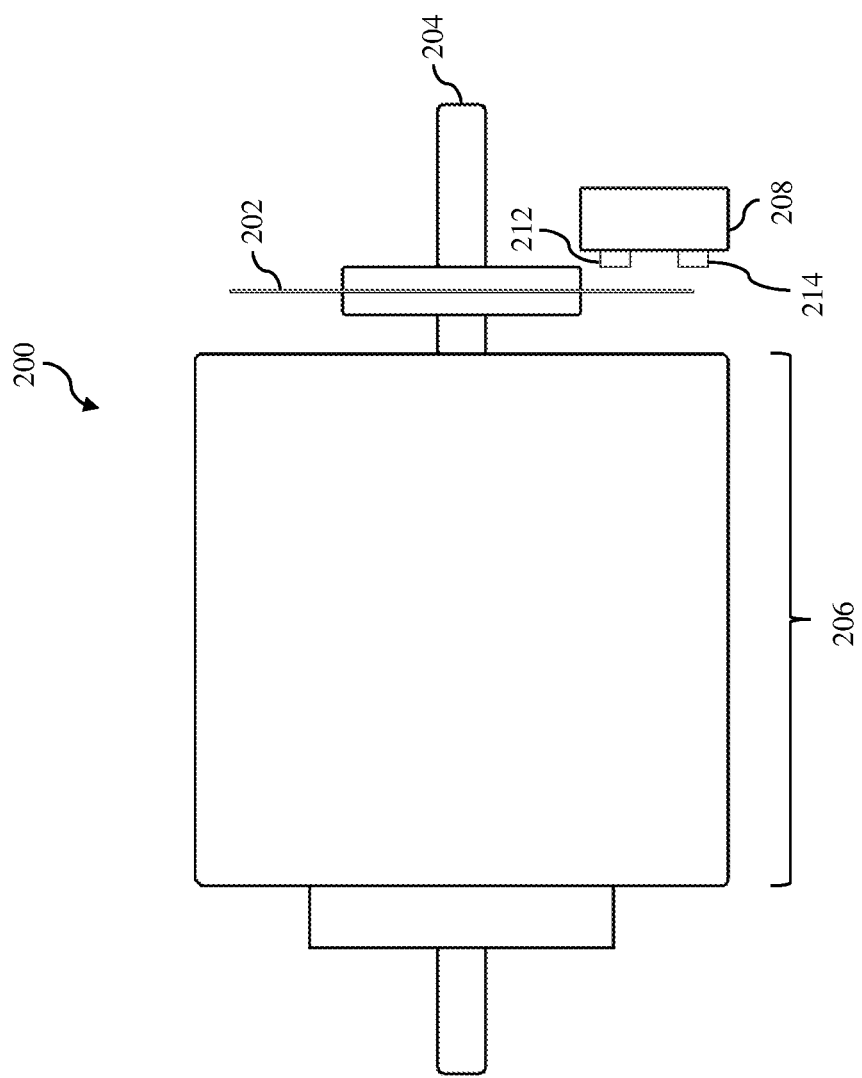
FIG. 2 illustrates a stepper motor with a reflective type encoder in accordance with the prior art.

FIG. 2 illustrates a conventional stepper motor 200 with a reflective-type encoder. FIG. 2 is a simple diagram of the stepper motor 200. As shown in FIG. 2, the stepper motor 200 includes a reflective encoder disk 202 attached to a rotating shaft 204 of the motor at the back of the motor outside of a main motor assembly 206, which houses a stator and a rotor (not shown). In addition, the stepper motor 200 includes an encoder reader 208 that uses a light emitter 212 and a light receiver 214, which are positioned to face the same side of the reflective encoder disk 202. Thus, the light receiver 214 is used to receive light from the light emitter 212 that is reflected off the reflective encoder disk 202. Again, the light received at the light receiver 214 provides information on the rotational motion of the encoder disk 202, which matches the rotation of the shaft 204 with respect to speed and position. As illustrated in FIG. 2, the encoder disk 202 and the encoder reader 208, which is attached to a printed circuit board (not shown), may be enclosed by a cover (not shown) outside of the main motor assembly 206.

As illustrated in these figures, a stepper motor with either type of encoder includes encoder components that are outside of the main motor assembly. Thus, the added encoder increases the overall size of the stepper motor. In addition, these encoder components and other parts, such as a cover, add to the overall manufacturing cost of the stepper motor.

Figure 3B:
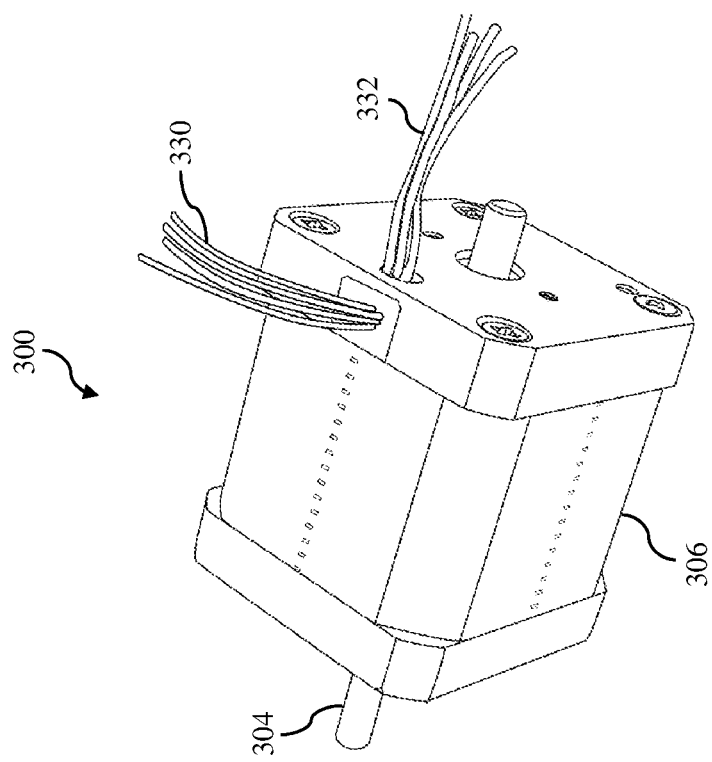
FIGS. 3A and 3B are perspective views of a stepper motor with internal encoder in accordance with an embodiment of the invention.
Figure 3A:
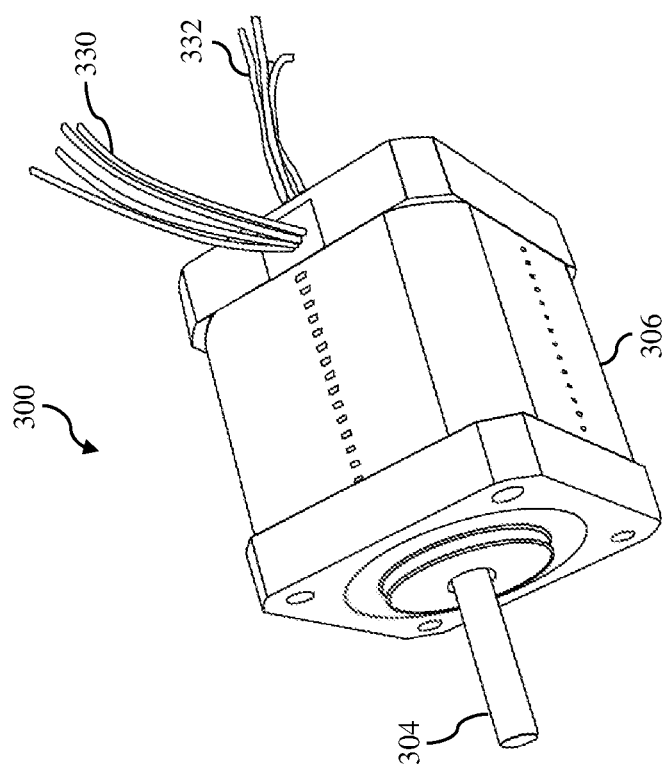

With reference to FIGS. 3A and 3B, a stepper motor 300 with internal encoder in accordance with an embodiment of the invention is described. FIG. 3A and 3B are different perspective views of the stepper motor 300. As illustrated in FIGS. 3A and 3B, the stepper motor 300 does not include any encoder components outside of a main motor assembly 306. The stepper motor 300 is shown to have stepper motor drive wires 330 and encoder signal wires 332 coming out of the main motor assembly 306. The drive wires 330 and the encoder signal wires 332 can come out from either the side of the motor cap or back of the motor cap. As explained below, the encoder or encoder unit of the stepper motor 300 is integrated with the motor within the main motor assembly 306. Thus, the overall size of the stepper motor 300 is not increased by the encoder unit. In fact, the overall size of the stepper motor 300 can be same as a stepper motor without an encoder unit.

Figure 4:
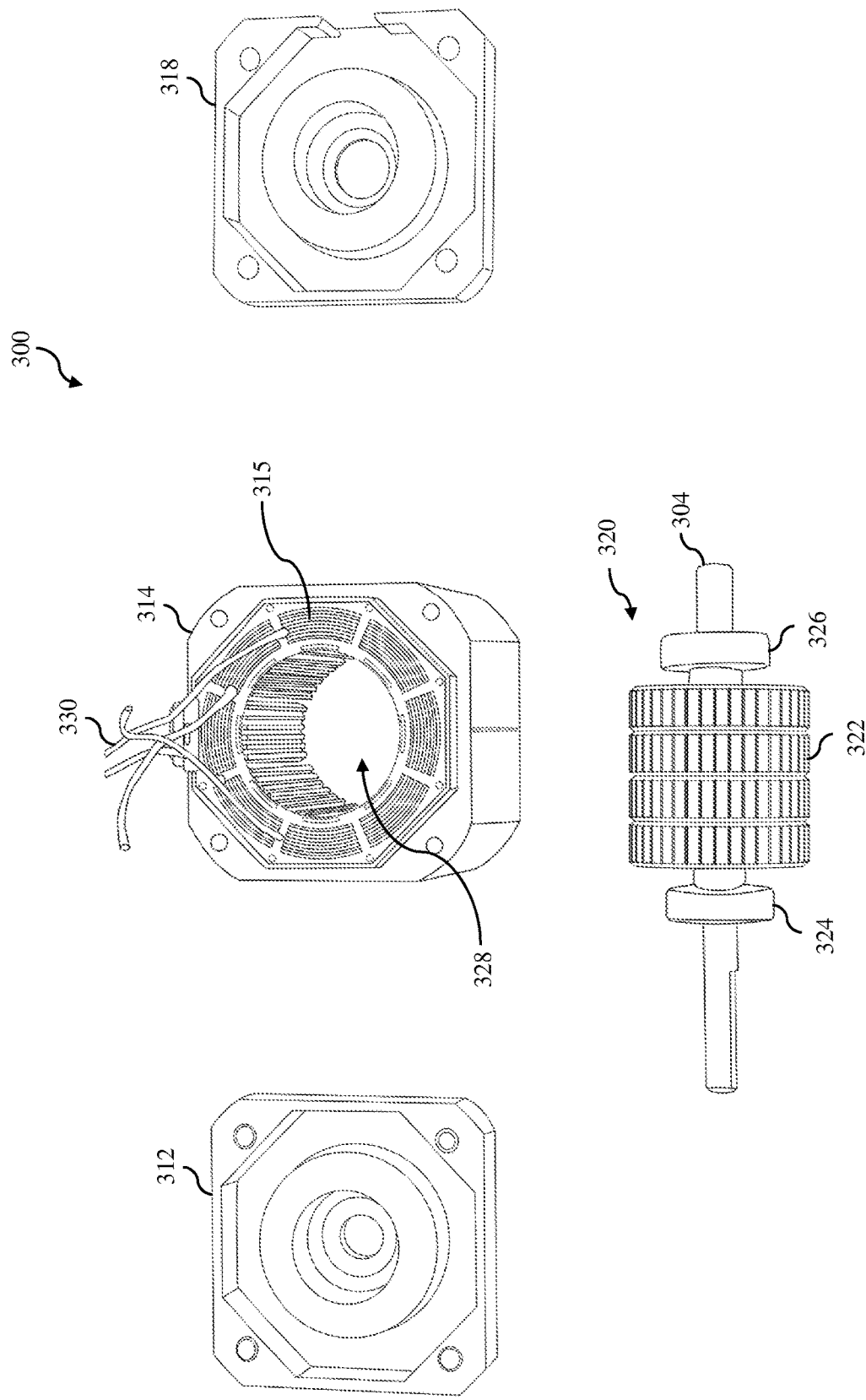
FIG. 4 shows the stepper motor of FIGS. 3A and 3B disassembled.

Turning now to FIG. 4, the stepper motor 300 is depicted as disassembled to show various conventional components of the stepper motor. As shown in FIG. 4, the stepper motor 300 includes a front cap 312, a stator 314 with drive windings 315, a back cap 318 and a rotor assembly 320. Components of an encoder unit of the stepper motor 200 are not depicted in FIG. 4.

As shown in FIG. 4, the rotor assembly 320 includes a magnetized rotor 322 with teeth, a front bearing 324 and a back bearing 326, which are connected to a shaft 304. When assembled, the rotor assembly 320 is positioned within an interior region 328 of the stator 314 with the front and back caps 312 and 318 attached to the front and back ends of the stator, which encloses the rotor 322 within the interior region of the stator, forming the main motor assembly 306. The stator 314 is shown with motor drive wires 330 coming out of the windings 315. These wires are used to apply driving signals to the winding 315 to rotate the rotor 322 during operation, which would rotate the shaft 304.

Figure 5:
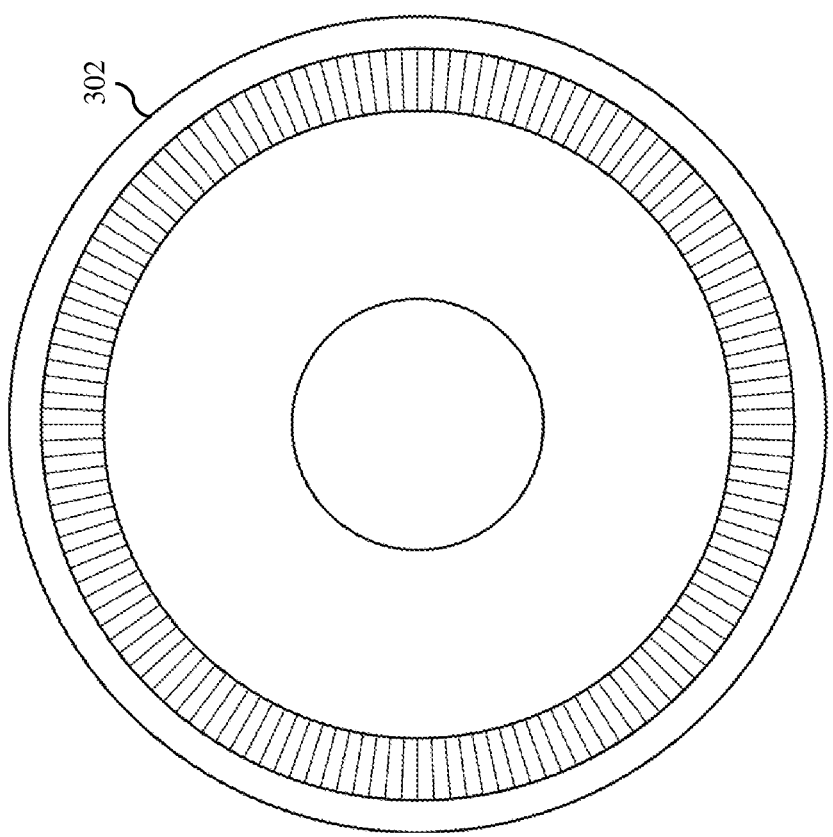
FIG. 5 shows a reflective encoder disk of the stepper motor of FIGS. 3A and 3B in accordance with an embodiment of the invention.
Figure 6B:
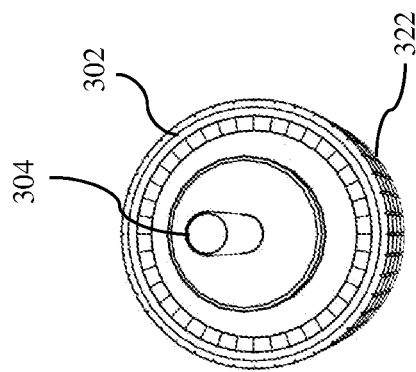
FIGS. 6A and 6B show a rotor assembly of the stepper motor of FIGS. 3A and 3B with the reflective encoder disk attached to a rotor of the rotor assembly in accordance with an embodiment of the invention.
Figure 6A:
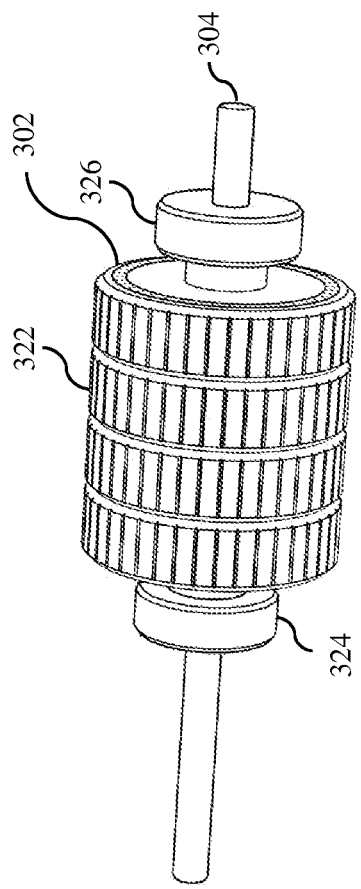
Figure 7:
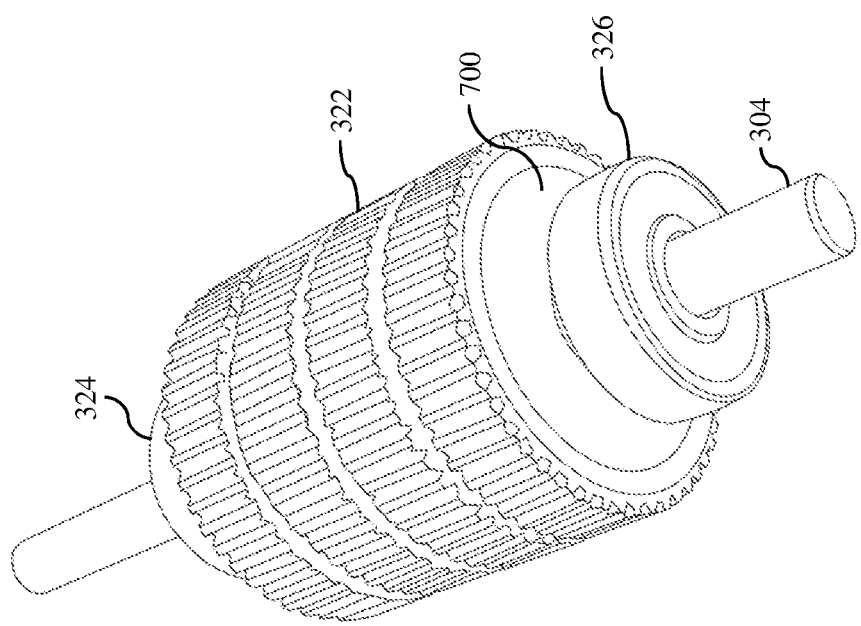
FIG. 7 illustrates the rotor assembly of the stepper motor of FIGS. 3A and 3B without the reflective encoder disk.

As described below, the components of the encoder unit of the stepper motor 300 are located within the main motor assembly 306, i.e., within the interior region 328 of the stator 314. One of the components of the encoder unit is a reflective encoder disk 302, which is illustrated in FIG. 5. The reflective encoder disk may be an incremental encoder disk and/or an absolute encoder disk. The reflective encoder disk 302 is attached to the rotor 322 of the stepper motor 300, as illustrated in FIG. 6A and 6B. In particular, the reflective encoder disk 302 is mounted on a flat surface of the rotor 322, which faces the back bearing 326. This flat surface 700 of the rotor 322 on which the reflective encoder disk 302 is mounted is more clearly shown in FIG. 7, which shows the flat surface of the rotor that faces the back bearing without the reflective encoder disk.

Figure 8A:
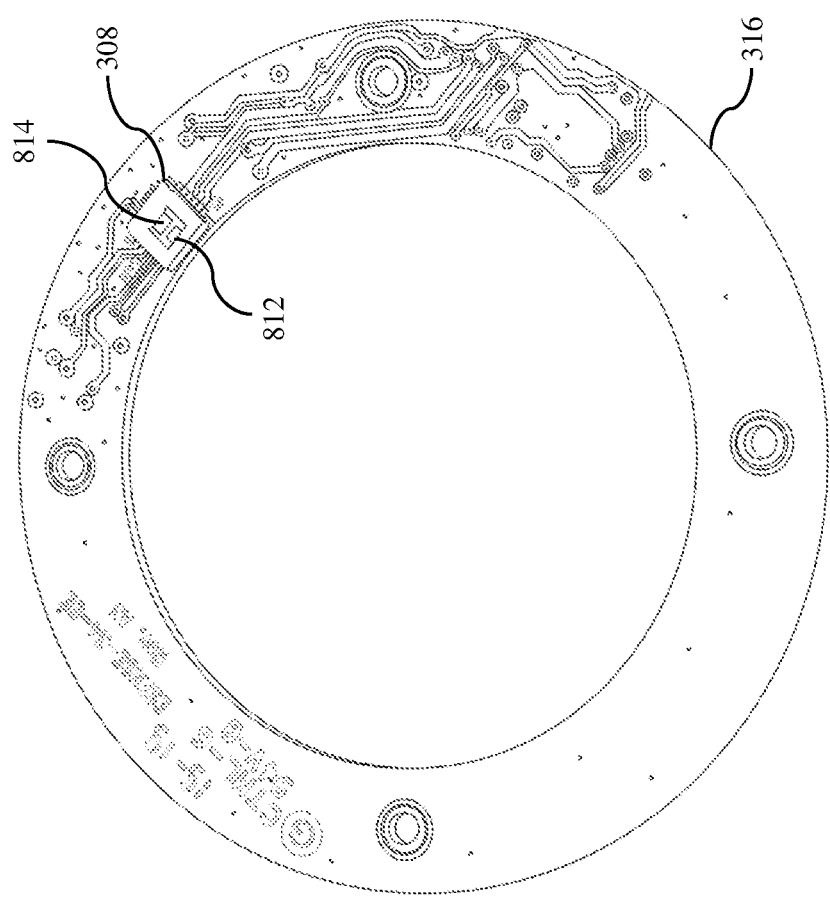
FIG. 8A shows a printed circuit board (PCB) with an encoder reader of the stepper motor of FIGS. 3A and 3B in accordance with an embodiment of the invention.

The other component of the encoder unit of the stepper motor 300 is an encoder reader 308, which is mounted on a printed circuit board (PCB) 316 in accordance with an embodiment of the invention, as illustrated in FIG. 8A. The encoder reader 308 includes a light emitter 812, e.g., a light emitting diode (LED), and a light receiver 814, such as a photodetector, that is packaged as a semiconductor chip. Similar to an encoder reader for a reflective type encoder unit, the light emitter 812 of the encoder reader 308 is designed to emit light at the reflective encoder disk 302, while the light receiver 814 is designed to receive the emitted light that is reflected off the reflective encoder disk to optically obtain rotational information of the stepper motor 300, such as position and/or speed. Thus, the encoder reader 308 needs to be placed to face the same side of the reflective encoder disk 302.

Figure 8B:
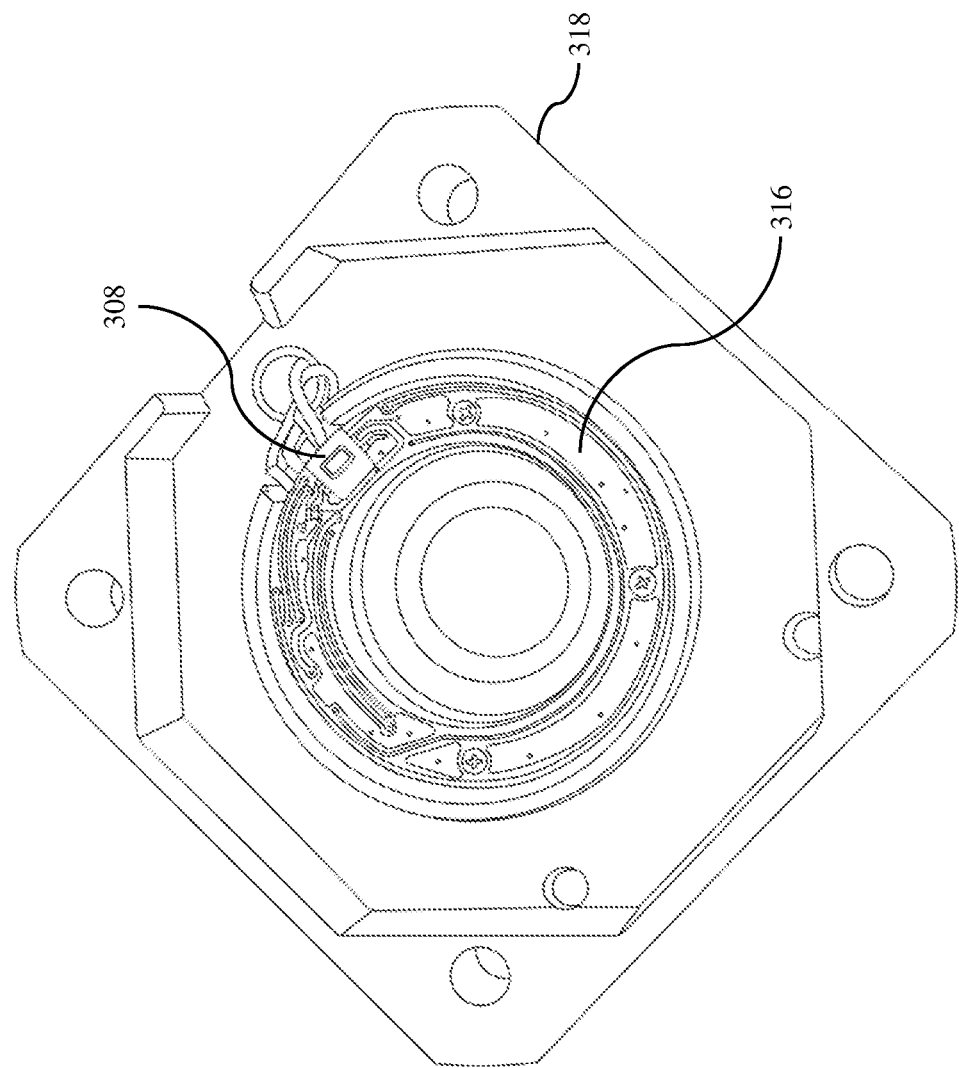
FIG. 8B shows the PCB of FIG. 8A attached to the back cap of the stepper motor of FIGS. 3A and 3B in accordance with an embodiment of the invention.
Figure 9:
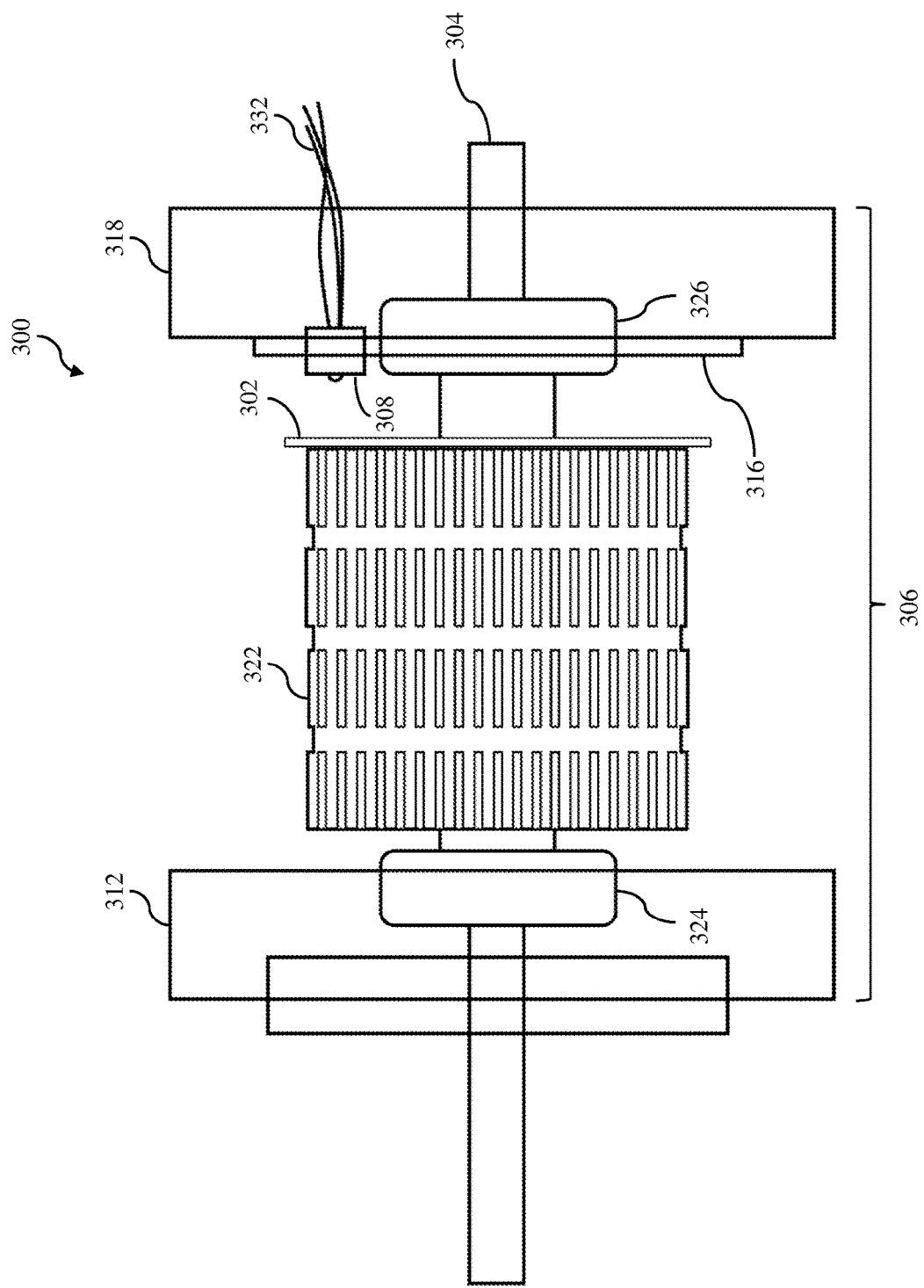
FIG. 9 illustrates the stepper motor of FIGS. 3A and 3B without the stator.

The PCB 316 with the encoder reader 308 is mounted on the inside of the back cap 318, as illustrated in FIG. 8B, so that the encoder reader is facing away from the back cap. Thus, when the back cap 318 is attached to the stator 314, the PCB 316 is positioned between the reflective encoder disk 302 attached to the rotor 322 and the back cap inside of the main motor assembly 306. Thus, the encoder reader 308 is positioned within the interior region 328 of the stator 314. In addition, the encoder reader 308 is positioned to face the reflective encoder disk 302. The location of the PCB 316 is illustrated in FIG. 9, which shows the stepper motor 300 assembled without the stator 314. As shown in FIG. 9, the PCB 316 is attached to the back cap 318 so that the PCB is located within the main motor assembly 306 and positioned between the reflective encoder disk 302, which is mounted on the rotor 322, and the back cap 318.

Figure 10:
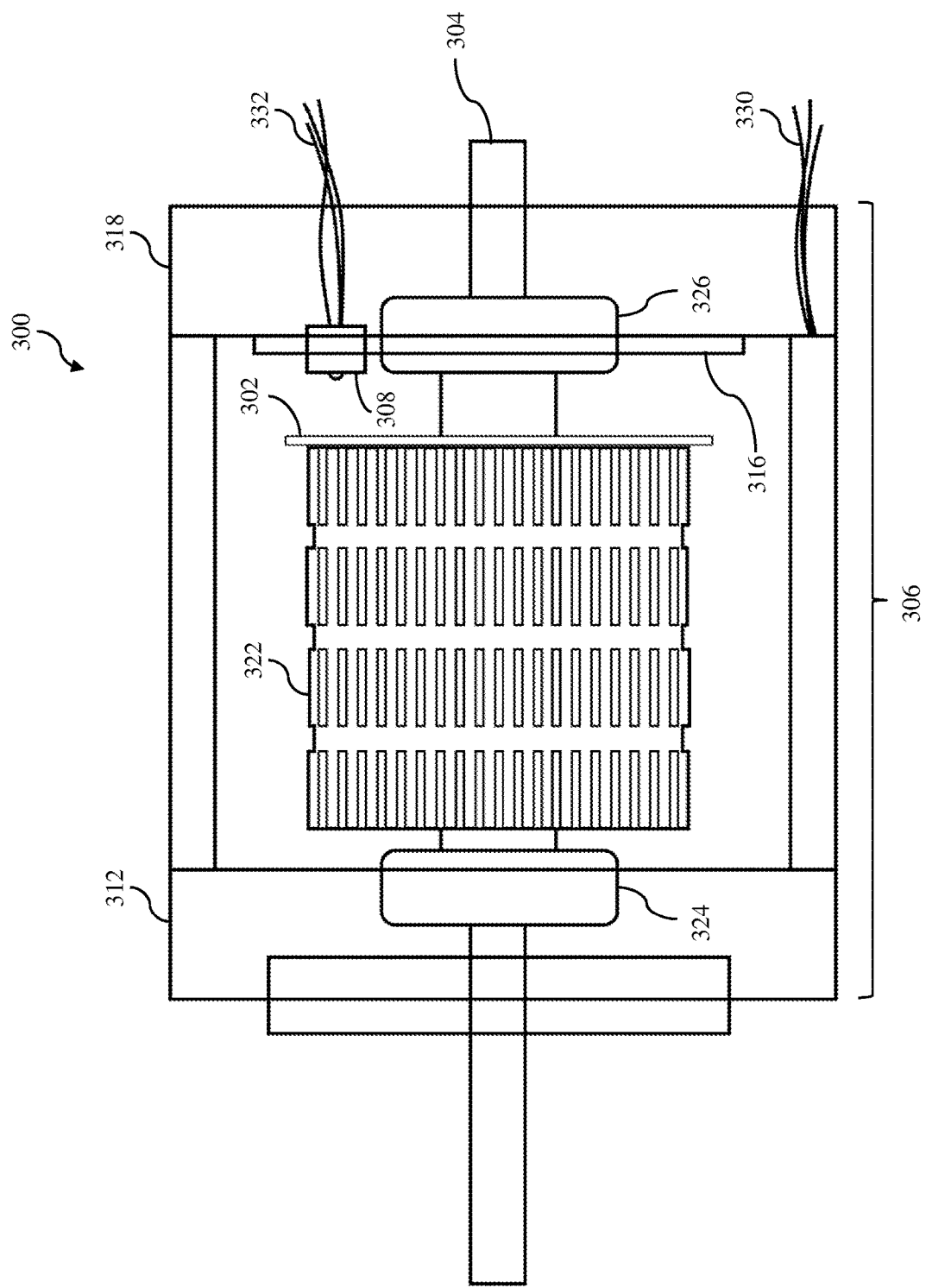
FIG. 10 is a diagram of the stepper motor of FIGS. 3A and 3B, showing the reflective encoder disk and the encoder reader within an interior region of the stator.

FIG. 10 is a diagram of the assembled stepper motor 300 in accordance with an embodiment of the invention. As shown in FIG. 10, the interior region 328 of stator 314, which is enclosed by the front and back caps 312 and 318, is shown. The rotor 322 is positioned within the interior region 328 of the stator 314. Thus, the reflective encoder disk 302, which is attached to the rotor 322, is also positioned within the interior region 328 of stator 314. In addition, the encoder reader 308, which is mounted on the PCB 316, is also positioned within interior region 328 of stator 314. Thus, all the components of the encoder unit for the stepper motor 300 are located within the interior region 328 of stator 314, which can be viewed as an interior region of the main motor assembly 306. Therefore, unlike conventional stepper motors with encoder units, such as the stepper motors 100 and 200, that have encoder components outside of their main motor assemblies, the stepper motor 300 has all the encoder components inside of the main motor assembly 306. Thus, the stepper motor 300 is significantly smaller than those convention stepper motors with external encoder units. Furthermore, the stepper motor 300 does not need a cover or other components for an external encoder unit, which reduces the overall manufacturing cost of the stepper motor.

In FIG. 10, the stepper motor 300 is shown with the wires 330 for the windings 315 of the stator 314. As explained above, these wires 330 are used to supply driving signals to the windings 315 to drive the magnetic rotor 322 to rotate in a desired manner In FIG. 10, the stepper motor 300 is also shown with additional wires 332 connected to the encoder reader 308. These wires 332 are used to control the light emitter 812 of the encoder reader 308 to emit light and to transmits signals from the light receiver 814 in response to received light at the light receiver, which include positional information with respect to the reflectively encoder disk 302.

Figure 11:
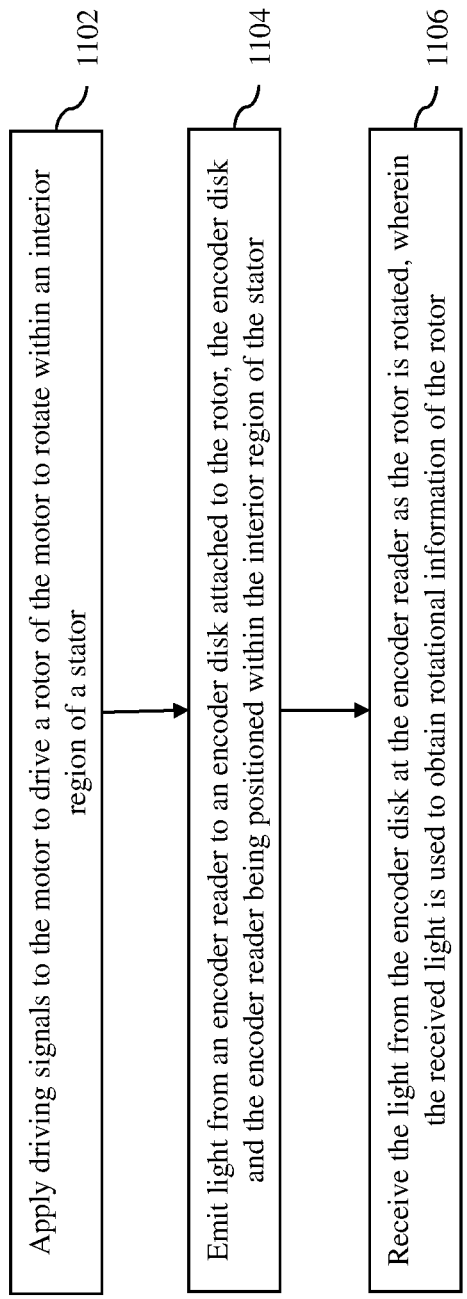
FIG. 11 is a process flow diagram of a method of operating a motor in accordance with an embodiment of the invention.

A method of operating a motor, such as the stepper motor 300, in accordance with an embodiment of the invention is described with reference to a process flow diagram of FIG. 11. At block 1102, driving signals are applied to the motor to drive a rotor of the motor to rotate within an interior region of a stator. At block 1104, light is emitted from an encoder reader to an encoder disk attached to the rotor. The encoder disk and the encoder reader are positioned within the interior region of the stator. At block 1106, the light from the encoder disk is received at the encoder reader as the rotor is rotated, wherein the received light is used to obtain rotational information of the rotor.

Although the motor in accordance with embodiments of the invention has been described and illustrated as a stepper motor, the described technique of placing the encoder inside the motor, i.e., the main motor assembly, can be applied to other types of motors.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A stepper motor comprising:
   a stator with an interior region;
   a rotor assembly with a rotor connected to a shaft, the rotor being positioned within the interior region of the stator;
   a reflective encoder disk attached directly to the rotor, the reflective encoder disk being positioned within the interior region of the stator;
   an encoder reader positioned within the interior region of the stator facing the encoder disk, the encoder reader including a light emitter to emit light to the reflective encoder and a light receiver to receive the light reflected off the reflective encoder disk to optically obtain rotational information of the rotor, wherein the encoder reader is attached to a ring-shaped printed circuit board (PCB);
   a front cap and a back cap that enclose the interior region, wherein the shaft extends through both the front cap and the back cap, wherein the ring-shaped PCB is attached to the back cap; and
   a front bearing attached to the front cap and a back bearing attached to the back cap, wherein the shaft extends through the front and back bearings and wherein the reflective encoder disk is positioned between the rotor and the back bearing.

2. The stepper motor of claim 1, wherein the back cap includes a recess in which the ring-shaped PCB is positioned.

3. The stepper motor of claim 1, wherein the back bearing is positioned through a center opening of the ring-shaped PCB.

4. The stepper motor of claim 1, wherein the front cap has a first recess in which the front bearing is positioned and wherein the back cap has a second recess in which the back bearing is positioned.

5. The stepper motor of claim 1, wherein the reflective encoder disk is directly attached to a flat surface of the rotor that faces the back cap.

6. The stepper motor of claim 1, wherein the reflective encoder disk is an absolute encoder disk or an incremental encoder disk.

7. The stepper motor of claim 1, wherein the stator includes a plurality of windings that are used to rotate the rotor.

8. A method of operating a stepper motor, the method comprising:
   applying driving signals to the stepper motor to drive a rotor of the stepper motor connected to a shaft to rotate within an interior region of a stator, wherein a front cap and a back cap enclose the interior region and wherein the shaft extends through both the front cap and the back cap;
   emitting light from a light emitter of an encoder reader to a reflective encoder disk directly attached to the rotor, the reflective encoder disk and the encoder reader being positioned within the interior region of the stator; and
   receiving the light reflected from the encoder disk at a light receiver of the encoder reader as the rotor is rotated, wherein the received light is used to obtain rotational information of the rotor, wherein the encoder reader is attached to a ring-shaped printed circuit board (PCB) that is attached to the back cap, wherein a front bearing is attached to the front cap and a back bearing is attached to the back cap, wherein the shaft extends through the front and back bearings and wherein the reflective encoder disk is positioned between the rotor and the back bearing.

9. The method of claim 8, wherein the back cap includes a recess in which the ring-shaped PCB is positioned.

10. The method of claim 8, wherein the back bearing is positioned through a center opening of the ring-shaped PCB.

11. The method of claim 8, wherein the front cap has a first recess in which the front bearing is positioned and wherein the back cap has a second recess in which the back bearing is positioned.

12. The method of claim 8, wherein the reflective encoder disk is directly attached to a flat surface of the rotor that faces the back cap.

13. The method of claim 8, wherein the reflective encoder disk is an absolute encoder disk or an incremental encoder disk.

14. The method of claim 8, wherein the stator includes a plurality of windings that are used to rotate the rotor in response to the driving signals.

* * * * *